(12) United States Patent
Zhang (10) Patent No.: US 9,723,608 B2
(45) Date of Patent: Aug. 1, 2017

(54) METHOD AND DEVICE FOR D2D COMMUNICATION

(71) Applicant: Huawei Technologies Co., Ltd., Shenzhen (CN)

(72) Inventor: Xingwei Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 193 days.

(21) Appl. No.: 14/671,609

(22) Filed: Mar. 27, 2015

(65) Prior Publication Data

US 2015/0201406 A1 Jul. 16, 2015

Related U.S. Application Data

(63) Continuation of application No. PCT/CN2013/084091, filed on Sep. 24, 2013.

(30) Foreign Application Priority Data

Sep. 29, 2012 (CN) .......................... 2012 1 0371617

(51) Int. Cl.
*H04W 72/04* (2009.01)
*H04L 5/00* (2006.01)
(Continued)

(52) U.S. Cl.
CPC ......... *H04W 72/044* (2013.01); *H04L 1/0009* (2013.01); *H04L 5/0055* (2013.01);
(Continued)

(58) Field of Classification Search
CPC . H04L 1/0009; H04L 27/2601; H04L 5/0007; H04L 5/0044; H04L 5/0051;
(Continued)

(56) References Cited

U.S. PATENT DOCUMENTS

2011/0103317 A1 5/2011 Ribeiro et al.
2011/0268046 A1 11/2011 Choi et al.
(Continued)

FOREIGN PATENT DOCUMENTS

CN 102223412 A 10/2011
CN 102307082 A 1/2012
(Continued)

OTHER PUBLICATIONS

Doppler et al., "Mode selection for Device-to-Device Communication underlaying an LTE-Advanced Network," WCNC 2010, Institute of Electrical and Electronics Engineers, New York, New York (2010).
(Continued)

*Primary Examiner* — Andrew Lai
*Assistant Examiner* — M Mostazir Rahman
(74) *Attorney, Agent, or Firm* — Leydig, Voit & Mayer, Ltd.

(57) ABSTRACT

The present invention discloses a method for D2D communication. The method includes carrying control information and data information, to be sent, in a physical resource block, wherein the physical resource block comprises M OFDM symbols in the time domain and N subcarriers in the frequency domain. The control information comprises at least one of MCS, RV, and NDI, at least one of the MCS, the RV, and the NDI being mapped onto an RE in a high frequency part of the physical resource block. The data information is mapped onto a blank RE in the physical resource block excluding the RE onto which the control information is mapped. The method also includes sending the physical resource block to a target user equipment on a D2D communication link. Spectral efficiency and data transmission rate can be improved by reasonably configuring an uplink physical channel of D2D communication.

16 Claims, 7 Drawing Sheets

(51) Int. Cl.
*H04W 76/02* (2009.01)
*H04L 1/00* (2006.01)
*H04L 27/26* (2006.01)

(52) U.S. Cl.
CPC ....... *H04L 27/2601* (2013.01); *H04W 76/023* (2013.01); *H04L 5/0007* (2013.01); *H04L 5/0044* (2013.01); *H04L 5/0051* (2013.01); *H04L 5/0053* (2013.01)

(58) Field of Classification Search
CPC .. H04L 5/0053; H04L 5/0055; H04W 72/044; H04W 76/023
See application file for complete search history.

(56) References Cited

U.S. PATENT DOCUMENTS

| | | |
|---|---|---|
| 2011/0310769 A1 | 12/2011 | Lee et al. |
| 2012/0051245 A1 | 3/2012 | Nam et al. |
| 2012/0083283 A1 | 4/2012 | Phan et al. |
| 2012/0113834 A1 | 5/2012 | Hunzinger |
| 2014/0003262 A1* | 1/2014 | He ........................ H04W 28/08 370/252 |
| 2014/0044024 A1* | 2/2014 | Zou ..................... H04W 76/023 370/280 |
| 2015/0163790 A1* | 6/2015 | Lee ........................ H04L 1/0025 370/329 |

FOREIGN PATENT DOCUMENTS

| | | |
|---|---|---|
| CN | 102316587 A | 1/2012 |
| EP | 2866366 A1 | 4/2015 |
| KR | 20120010099 A | 2/2012 |
| WO | WO 2012011658 A2 | 1/2012 |
| WO | WO 2012031389 A1 | 3/2012 |

OTHER PUBLICATIONS

Lei et al., "Operator Controlled Device-to-Device Communications in LTE-advanced Networks," IEEE Wireless Communications, pp. 96-104, Institute of Electrical and Electronics Engineers, New York, New York (Jun. 2012).

* cited by examiner

METHOD AND DEVICE FOR D2D COMMUNICATION

CROSS-REFERENCE TO RELATED APPLICATIONS

This application is a continuation of International Patent Application No. PCT/CN2013/084091, filed on Sep. 24, 2013, which claims priority to Chinese Patent Application No. 201210371617.5, filed on Sep. 29, 2012, both of which are hereby incorporated by reference in their entireties.

TECHNICAL FIELD

The present invention relates to communications, and more particularly, to a method and a device for device-to-device (D2D) communication.

BACKGROUND

The 3rd Generation Partnership Project (3GPP) Long Term Evolution-Advance Rel-10/11 (LTE-A Rel-10/11) is an enhancement of LTE Rel-8 technology. An LTE-A system has a higher bandwidth requirement than an LTE system, and supports a peak data rate up to 1 Gbits/s. In order to meet the bandwidth requirement of LTE-A, the LTE-A system uses a Carrier Aggregation (CA) technology as a method for expanding system bandwidth, and extensively adopts a Multiple Input Multiple Output (MIMO) enhancement technology (also referred to as a multi-antenna technology) and an adaptive technology to improve data rate and system performance.

Although the LTE-A adopts a variety of technologies to improve data rate, with rapid development of wireless communications and the emergence of super high rate services (such as high-definition video), loads on a wireless communication network have become heavier and heavier. Reducing network load has become a hot research topic, which has promoted emergence of D2D communication. D2D communication is quite likely to become a major project of LTE-A Rel-12. In D2D communication mode, two terminals may communicate directly without forwarding of a base station, thereby sharing data load of the base station. Since there is only one hop in the D2D communication, no intermediate device is needed, thereby better utilizing spectral resources, improving spectral efficiency and data transmission rate, and alleviating burden of the base station.

In order to improve spectral efficiency and to more fully utilize the radio frequency capabilities of an existing terminal, a D2D communication link shares spectral resources with an existing mobile communication network. In order to not interfere with a terminal of the existing network, D2D communication does not use downlink spectral resources (i.e., a link from an eNB to a UE) of the LTE-A, and only multiplexes uplink spectral resources (i.e., a link from a UE to an eNB) of the LTE-A, as a base station has much better anti-interference capability than a common User Equipment (UE). It has a relatively larger probability that two D2D devices time division multiplex on the uplink spectral resource, therefore, it is not necessary to support simultaneously receiving and sending, and one device can just receive while another device is sending.

SUMMARY

An embodiment of the present invention provides a method and a device for D2D communication that can improve spectral efficiency and data transmission rates.

An embodiment of the present invention provides a method for D2D communication, including:

carrying control information and data information, to be sent, in a physical resource block, wherein the physical resource block includes M orthogonal frequency division multiplexing (OFDM) symbols in time domain and includes N subcarriers in frequency domain, time frequency resource defined by one OFDM symbol and one subcarrier being a resource element (RE), and M and N being integers; and wherein the control information includes at least one of a modulation and coding scheme (MCS), a redundancy version (RV) and a new data indicator (NDI), at least one of the MCS, the RV and the NDI being mapped onto an RE in high frequency part of the physical resource block, and the data information being mapped onto a blank RE in the physical resource block excluding the RE onto which the control information is mapped; and sending the physical resource block to a target user equipment on a device to device (D2D) communication link.

Another embodiment of the present invention provides a method for D2D communication, including:

carrying control information and data information, to be sent, in a physical resource block, wherein the physical resource block includes M orthogonal frequency division multiplexing (OFDM) symbols in time domain and includes N subcarriers in frequency domain, time frequency resource defined by one OFDM symbol and one subcarrier being a resource element (RE), and M and N being integers; and wherein the control information includes at least one of a channel quality indicator (CQI) and a pre-coding matrix indicator (PMI), at least one of the CQI and the PMI being mapped onto an RE in high frequency part of the physical resource block, and the data information being mapped onto a blank RE in the physical resource block excluding the RE onto which the control information is mapped; and sending the physical resource block to a target user equipment on a device to device (D2D) communication link.

Another embodiment of the present invention provides a device for D2D communication, including:

a first channel configuring unit, configured to carry control information and data information, to be sent, in a physical resource block, wherein the physical resource block includes M orthogonal frequency division multiplexing (OFDM) symbols in time domain and includes N subcarriers in frequency domain, time frequency resource defined by one OFDM symbol and one subcarrier being a resource element (RE), and M and N being integers; and wherein the control information includes at least one of a modulation and coding scheme (MCS), a redundancy version (RV) and a new data indicator (NDI), at least one of the MCS, the RV and the NDI being mapped onto an RE in high frequency part of the physical resource block, and the data information being mapped onto a blank RE in the physical resource block excluding the RE onto which the control information is mapped; and a first uplink sending unit, configured to send the physical resource block to a target user equipment on a device to device (D2D) communication link.

Another embodiment of the present invention provides a device for D2D communication, including:

a second channel configuring unit, configured to carry control information and data information, to be sent, in a physical resource block, wherein the physical resource block includes M orthogonal frequency division multiplexing (OFDM) symbols in time domain and includes N subcarriers in frequency domain, time frequency resource defined by one OFDM symbol and one subcarrier being a resource element (RE), and M and N being integers; and wherein the control information includes at least one of a channel quality indicator (CQI) and a pre-coding matrix indicator (PMI), at least one of the CQI and the PMI being mapped onto an RE in high frequency part of the physical resource block, and the data information being mapped onto a blank RE in the physical resource block excluding the RE onto which the control information is mapped; and second uplink sending unit, configured to send the physical resource block to a target user equipment on a device to device (D2D) communication link.

According to a method and a device for D2D communication provided by an embodiment of the present invention, the uplink physical channel of D2D communication is designed with reference to the structure of the uplink physical channel of LTE-A. Signals such as MCS, RV, NDI, CQI, PMI, and the like are mapped onto an RE in high frequency part of the physical resource block, and are distributed separately from signals such as A/N, RI and the like, which are mapped onto an RE in low frequency part, such that each kind of signal on the physical resource block may be distributed relatively intensively and continuously. In an embodiment of the present invention, the uplink physical channel of D2D communication is reasonably configured so as to achieve communication between D2D devices, thereby improving spectral efficiency and data transmission rate.

BRIEF DESCRIPTION OF DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DESCRIPTION OF EMBODIMENTS

Embodiments of the present invention will be described clearly and fully hereinafter in conjunction with the drawings. The embodiments described are only a part, but not all, of the embodiments of the present invention. All other embodiments, which can be derived by the persons of ordinary skills in the art based on the embodiments described herein without any inventive efforts, fall into the protective scope of the present invention.

An embodiment of the present invention provides a method for D2D communication, including:

carrying control information and data information, to be sent, in a physical resource block, wherein the physical resource block includes M orthogonal frequency division multiplexing (OFDM) symbols in time domain and includes N subcarriers in frequency domain, time frequency resource defined by one OFDM symbol and one subcarrier being a resource element (RE), and M and N being integers; and wherein the control information includes at least one of a modulation and coding scheme (MCS), a redundancy version (RV) and a new data indicator (NDI), at least one of the MCS, the RV and the NDI being mapped onto an RE in high frequency part of the physical resource block, and the data information being mapped onto a blank RE in the physical resource block excluding the RE onto which the control information is mapped; and sending the physical resource block to a target user equipment on a device to device (D2D) communication link.

Further, the control information includes a demodulation reference signal (DMRS), an acknowledgement/negative acknowledgement (A/N), and a rank indicator (RI).

The DMRS is mapped onto at least one first OFDM symbol in the physical resource block.

The A/N is mapped onto at least one second OFDM symbol in the physical resource block and is distributed on the second OFDM symbol from low frequency to high frequency. The second OFDM symbol occupied by the A/N is adjacent to the first OFDM symbol occupied by the DMRS.

The RI is mapped onto at least one third OFDM symbol in the physical resource block and is distributed on the third OFDM symbol from low frequency to high frequency. One OFDM symbol is present between the third OFDM symbol occupied by the RI and the first OFDM symbol occupied by the DMRS.

The control information may further include a sounding reference signal (SRS), and the SRS is mapped onto the last OFDM symbol along the time domain direction in the physical resource block. It should be noted that, whether the sounding reference signal SRS is mapped into the physical resource block is determined by practical application demand.

In one optional implementation, at least one of the MCS, the RV and the NDI, which is mapped onto a blank RE in the high frequency part of the physical resource block, is mapped from a subcarrier with highest frequency, distributed along a time domain direction, and extended onto a next adjacent subcarrier after fully occupying the subcarrier with the highest frequency.

In another optional implementation, at least one of the MCS, the RV and the NDI is mapped onto at least one fourth OFDM symbol in the physical resource block, and is distributed on the fourth OFDM symbol from high frequency to low frequency. The fourth OFDM symbol is adjacent to the first OFDM symbol occupied by the DMRS.

The data information is mapped onto a blank RE in the physical resource block excluding an RE occupied by the control information.

According to the method for D2D communication provided by the embodiment of the present invention, an uplink physical channel of D2D communication is designed with reference to a structure of an uplink physical channel of LTE-A, which can improve spectral efficiency and data transmission rate.

Preferably, the physical resource block is expressed by a two-dimensional plane composed of time and frequency. The physical resource block includes 14 orthogonal frequency division multiplexing (OFDM) symbols in the time domain and includes 12 subcarriers in the frequency domain; or the physical resource block includes 12 orthogonal frequency division multiplexing (OFDM) symbols in the time domain and includes 12 subcarriers in the frequency domain.

A method for designing a D2D uplink physical channel will be illustrated below in detail in combination with FIG. 1 to FIG. 4.

Figure 1:
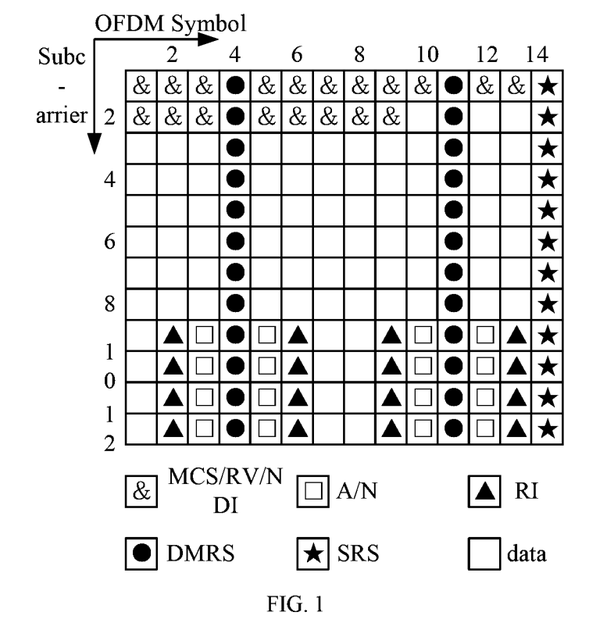
FIG. 1 is a schematic diagram of an uplink physical channel of a first embodiment of a method for D2D communication provided by the present invention.

Referring to FIG. 1, an uplink physical channel of a first embodiment of the method for D2D communication provided by the present invention is schematically depicted.

In the first embodiment, a physical resource block includes 14 orthogonal frequency division multiplexing (OFDM) symbols in the time domain, which are the first OFDM symbol to the $14^{th}$ OFDM symbol in sequence along a time domain direction. The physical resource block includes 12 subcarriers in the frequency domain, which are the first subcarrier to the $12^{th}$ subcarrier in sequence along a direction from high frequency to low frequency.

The control information includes a modulation and coding scheme (MCS), a redundancy version (RV), a new data indicator (NDI), a demodulation reference signal (DMRS), an acknowledgement/negative acknowledgement (A/N) and a rank indicator (RI).

The control information and the data information are carried in a physical resource block by means of the following manner.

The DMRS is mapped onto the $4^{th}$ and the $11^{th}$ OFDM symbols in the physical resource block.

The A/N is mapped onto the $3^{rd}$, the $5^{th}$, the $10^{th}$ and the $12^{th}$ OFDM symbols in the physical resource block and is distributed from low frequency to high frequency. The OFDM symbols occupied by the A/N are adjacent to the OFDM symbols occupied by the DMRS.

The RI is mapped onto the $2^{nd}$, the $6^{th}$, the $9^{th}$ and the $13^{th}$ OFDM symbols in the physical resource block and is distributed from low frequency to high frequency. One OFDM symbol is present between the OFDM symbols occupied by the RI and the OFDM symbols occupied by the DMRS.

The SRS is mapped onto the last OFDM symbol in the physical resource block along the time domain direction, namely, the SRS is mapped onto the $14^{th}$ OFDM symbol in the physical resource block.

At least one of the MCS, the RV and the NDI is mapped onto a blank RE in high frequency part of the physical resource block. The at least one of the MCS, the RV and the NDI is mapped from the first subcarrier with the highest frequency, distributed along the time domain direction and extended onto a next adjacent subcarrier after the first subcarrier is fully occupied. Specifically, as shown in FIG. 1, at least one of the MCS, the RV and the NDI is mapped onto the blank REs in the high frequency part of the physical resource block, and starting from the first subcarrier along the time domain direction, the at least one of the MCS, the RV and the NDI is transversely distributed from left to right. The at least one of the MCS, the RV and the NDI is moved onto the second subcarrier after the first subcarrier is fully occupied and is transversely distributed from left to right likewise, and so on, until configuration of the at least one of the MCS, the RV and the NDI is completed.

The data information is mapped onto a blank RE in the physical resource block excluding the RE onto which the control information is mapped.

Figure 2:
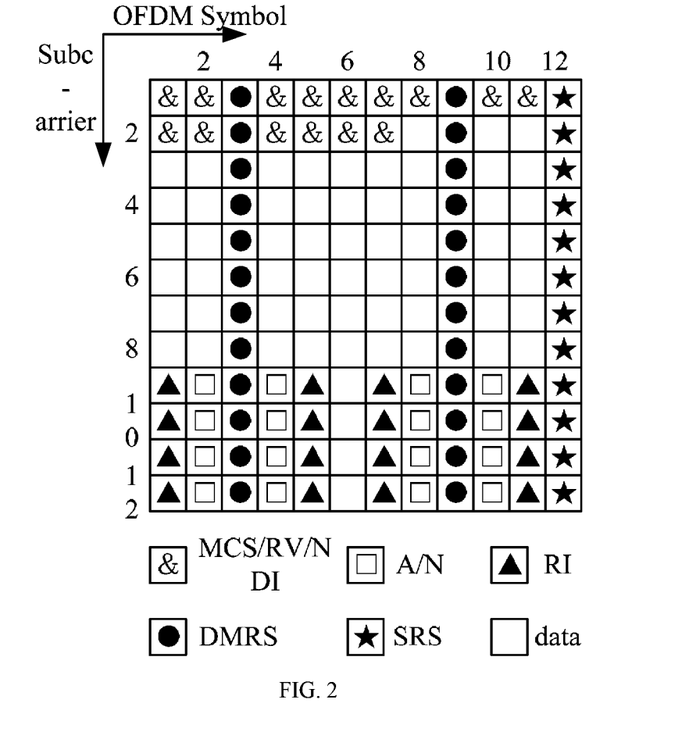
FIG. 2 is a schematic diagram of an uplink physical channel of a second embodiment of a method for D2D communication provided by the present invention.

Referring to FIG. 2, an uplink physical channel of a second embodiment of the method for D2D communication provided by the present invention is schematically depicted.

In the second embodiment, a physical resource block includes 12 orthogonal frequency division multiplexing (OFDM) symbols in the time domain, which are the first OFDM symbol to the $12^{th}$ OFDM symbol in sequence along a time domain direction. The physical resource block includes 12 subcarriers in the frequency domain, which are the first subcarrier to the $12^{th}$ subcarrier in sequence along a direction from high frequency to low frequency.

The control information includes a modulation and coding scheme (MCS), a redundancy version (RV), a new data indicator (NDI), a demodulation reference signal (DMRS), a sounding reference signal (SRS), an acknowledgement/negative acknowledgement (A/N) and a rank indicator (RI).

The control information and the data information are carried in a physical resource block by means of the following manner.

The DMRS is mapped onto the $3^{rd}$ and the $9^{th}$ OFDM symbols in the physical resource block.

The A/N is mapped onto the $2^{nd}$, the $4^{th}$, the $8^{th}$ and the $10^{th}$ OFDM symbols in the physical resource block and is distributed from low frequency to high frequency. The OFDM symbols occupied by the A/N are adjacent to the OFDM symbols occupied by the DMRS.

The RI is mapped onto the $1^{st}$, the $5^{th}$, the $7^{th}$ and the $11^{th}$ OFDM symbols in the physical resource block and is distributed from low frequency to high frequency. One OFDM symbol is present between the OFDM symbols occupied by the RI and the OFDM symbols occupied by the DMRS.

The SRS is mapped onto the last OFDM symbol along the time domain direction in the physical resource block, namely, the SRS is mapped onto the $12^{th}$ OFDM symbol in the physical resource block.

At least one of the MCS, the RV and the NDI is mapped onto a blank RE in high frequency part of the physical resource block. The at least one of the MCS, the RV and the NDI is mapped from the first subcarrier with the highest frequency, distributed along the time domain direction and extended onto a next adjacent subcarrier after the first subcarrier is fully occupied. Specifically, as shown in FIG. 2, at least one of the MCS, the RV and the NDI is mapped onto the blank REs in the high frequency part of the physical resource block, and starting from the first subcarrier along the time domain direction, the at least one of the MCS, the RV and the NDI is transversely distributed from left to right. The at least one of the MCS, the RV and the NDI is moved onto the second subcarrier after the first subcarrier is fully occupied and is transversely distributed from left to right likewise, and so on, until configuration of the at least one of the MCS, the RV and the NDI is completed.

The data information is mapped onto a blank RE in the physical resource block excluding the RE onto which the control information is mapped.

During specific implementation, an executive body of the method for D2D communication provided by the above-mentioned first embodiment and second embodiment may be a device for D2D communication, or a device provided with D2D communication functionality. Two devices for D2D communication have equivalent uplink and downlink channels, and thus use a same physical channel design.

When device 1 for D2D communication communicates with device 2 for D2D communication, design of the physical channel in the above-mentioned embodiment is simultaneously applied to a link from the device 1 for D2D communication to the device 2 for D2D communication and a link from the device 2 for D2D communication to the device 1 for D2D communication. The device 1 for D2D communication carries the control information and the data information, which are needed to be sent, in a physical resource block, and sends the physical resource block to the device 2 for D2D communication through a D2D uplink communication link, wherein an MCS is carried in the physical resource block. Since uplink channel and downlink channel of a device for D2D communication are equivalent, sending and receiving of the two devices for D2D communication are time division multiplexed on one frequency, and thus an emitting channel matrix may be obtained by performing inversion operation on a receiving channel matrix according to channel reciprocity, thus the two devices for D2D communication do not need to report PMI to one another. In D2D communication, the two devices for D2D communication are equivalent, and do not need to report CQI. The two devices for D2D communication may respectively measure channel state information and then determine a MCS that is to be used, and report the MCS to the opposite party. The opposite party does not need to carry the MCS when the opposite party sends data, since the MCS has been known to the both parties. Therefore, the two devices for D2D communication do not need to report CQI to each other, thereby reducing part of air interface messages.

Figure 3:
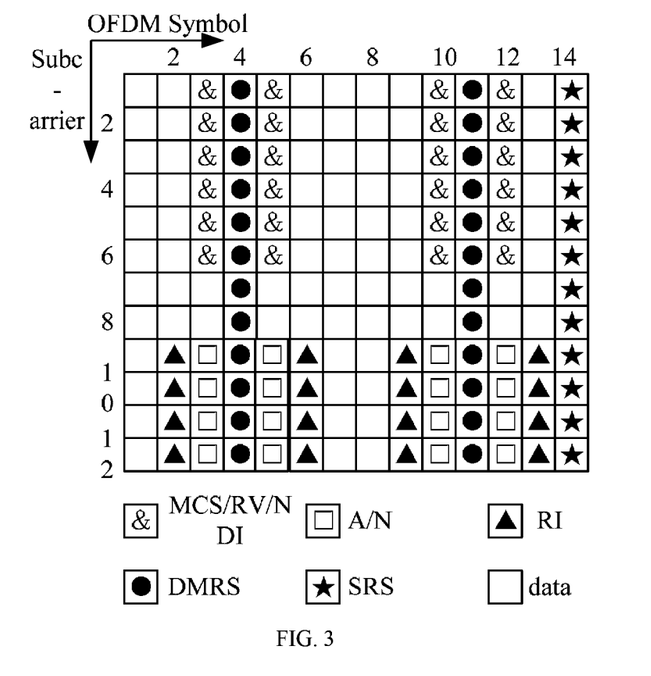
FIG. 3 is a schematic diagram of an uplink physical channel of a third embodiment of a method for D2D communication provided by the present invention.

Referring to FIG. 3, an uplink physical channel of a third embodiment of the method for D2D communication provided by the present invention is schematically depicted.

In the third embodiment, a physical resource block includes 14 orthogonal frequency division multiplexing (OFDM) symbols in the time domain, which are the first OFDM symbol to the 14$^{th}$ OFDM symbol in sequence along a time domain direction. The physical resource block includes 12 subcarriers in the frequency domain, which are the first subcarrier to the 12$^{th}$ subcarrier in sequence along a direction from high frequency to low frequency.

The control information includes a modulation and coding scheme (MCS), a redundancy version (RV), a new data indicator (NDI), a demodulation reference signal (DMRS), a sounding reference signal (SRS), an acknowledgement/negative acknowledgement (A/N) and a rank indicator (RI).

A method for mapping the DMRS, the SRS, the A/N and the RI in the physical resource block is the same as that in the above-mentioned first embodiment, and will not be described redundantly herein.

Compared with the above-mentioned first embodiment, the difference of the third embodiment lies in that, at least one of the MCS, the RV and the NDI is mapped onto an OFDM symbol in the physical resource block, adjacent to an OFDM symbol onto which the DMRS is mapped, and is distributed on the OFDM symbol from high frequency to low frequency. For example, as shown in FIG. 3, at least one of the MCS, the RV and the NDI is mapped onto the 3$^{rd}$ the 5$^{th}$, the 10$^{th}$ and the 12$^{th}$ OFDM symbols in the physical resource block and is distributed from high frequency to low frequency.

The data information is mapped onto a blank RE in the physical resource block excluding the RE onto which the control information is mapped.

Figure 4:
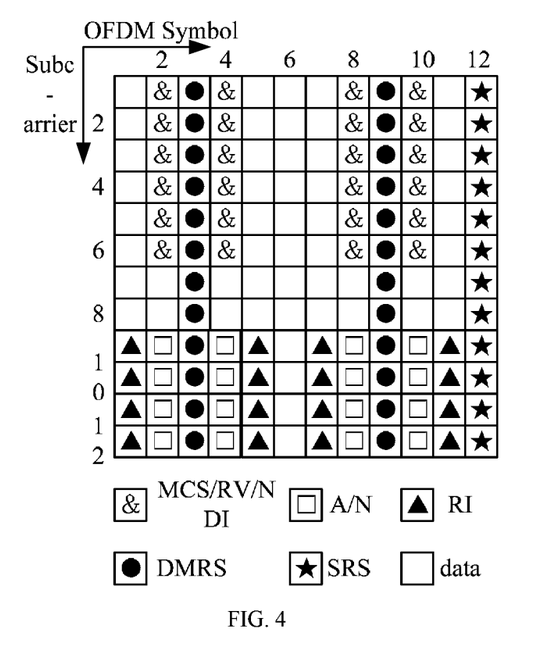
FIG. 4 is a schematic diagram of an uplink physical channel of a fourth embodiment of a method for D2D communication provided by the present invention.

Referring to FIG. 4, an uplink physical channel of a fourth embodiment of the method for D2D communication provided by the present invention is schematically depicted.

In the fourth embodiment, a physical resource block includes 12 orthogonal frequency division multiplexing (OFDM) symbols in the time domain, which are the first OFDM symbol to the 12$^{th}$ OFDM symbol in sequence along a time domain direction. The physical resource block includes 12 subcarriers in the frequency domain, which are the first subcarrier to the 12$^{th}$ subcarrier in sequence along a direction from high frequency to low frequency.

The control information includes a modulation and coding scheme (MCS), a redundancy version (RV), a new data indicator (NDI), a demodulation reference signal (DMRS), a sounding reference signal (SRS), an acknowledgement/negative acknowledgement (A/N) and a rank indicator (RI).

A method for mapping the DMRS, the SRS, the A/N and the RI in the physical resource block is the same as that in the above-mentioned second embodiment, and will not be described redundantly herein.

Compared with the above-mentioned second embodiment, the difference of the fourth embodiment lies in that, at least one of the MCS, the RV and the NDI is mapped onto an OFDM symbol in the physical resource block, adjacent to an OFDM symbol onto which the DMRS is mapped, and is distributed on the OFDM symbol from high frequency to low frequency. For example, as shown in FIG. 4, at least one of the MCS, the RV and the NDI is mapped onto the 2$^{th}$, the 4$^{th}$, the 8$^{th}$ and the 10$^{th}$ OFDM symbols in the physical resource block and is distributed from high frequency to low frequency.

The data information is mapped onto a blank RE in the physical resource block excluding the RE onto which the control information is mapped.

During specific implementation, an executive body of the method for D2D communication provided by the above-mentioned third embodiment and fourth embodiment may be a device for D2D communication, or a device provided with D2D communication functionality. Two devices for D2D communication have equivalent uplink and downlink channels, and thus use a same physical channel design.

When device 1 for D2D communication communicates with device 2 for D2D communication, design of the physical channel in the above-mentioned embodiment is simultaneously applied to a link from the device 1 for D2D communication to the device 2 for D2D communication and to a link from the device 2 for D2D communication to the device 1 for D2D communication. The device 1 for D2D communication carries the control information and the data information, which are needed to be sent, in a physical resource block, and sends the physical resource block to the device 2 for D2D communication through a D2D uplink communication link, wherein an MCS is carried in the physical resource block, and the MCS is distributed on two OFDM symbols next to the DMRS. During channel estimation, channel estimation is more accurate regarding a symbol closer to the DMRS, and control information has a higher BLER (Block Error Ratio, block error ratio) requirement relative to data. Therefore, distributing the MCS on an adjacent OFDM symbol of the DMRS may improve demodulation performance.

It should be noted that, in the design manners of the physical channel of the above-mentioned first embodiment, second embodiment, third embodiment and fourth embodiment, an NDI field may be omitted. In addition, considering that a distance between devices for D2D communication is relatively short, less MCSs may be used. For example, only high-order or low-order modulation manner is used, only relatively higher or relatively lower coding rate is used, and the like, so that MCS bits may be reduced. Moreover, if less MCS bits are used, an MCS level may be re-defined as well.

An embodiment of the present invention further provides another method for D2D communication, including:

carrying control information and data information, to be sent, in a physical resource block, wherein the physical resource block includes M orthogonal frequency division multiplexing (OFDM) symbols in time domain and includes N subcarriers in frequency domain, time frequency resource defined by one OFDM symbol and one subcarrier being a resource element (RE), and M and N being integers; and wherein the control information includes at least one of a channel quality indicator (CQI) and a pre-coding matrix indicator (PMI), at least one of the CQI and the PMI being mapped onto an RE in high frequency part of the physical resource block, and the data information being mapped onto a blank RE in the physical resource block excluding the RE onto which the control information is mapped; and sending the physical resource block to a target user equipment on a device to device (D2D) communication link.

Further, the control information further includes a demodulation reference signal (DMRS), an acknowledgement/negative acknowledgement (A/N) and a rank indicator (RI).

The DMRS is mapped onto at least one first OFDM symbol in the physical resource block.

The A/N is mapped onto at least one second OFDM symbol in the physical resource block and is distributed on the second OFDM symbol from low frequency to high frequency. The second OFDM symbol occupied by the A/N is adjacent to the first OFDM symbol occupied by the DMRS.

The RI is mapped onto at least one third OFDM symbol in the physical resource block and is distributed on the third OFDM symbol from low frequency to high frequency. One OFDM symbol is present between the third OFDM symbol occupied by the RI and the first OFDM symbol occupied by the DMRS.

At least one of the CQI and the PMI, which is mapped onto a blank RE in the high frequency part of the physical resource block, is mapped from a subcarrier with highest frequency, distributed along a time domain direction, and extended onto a next adjacent subcarrier after fully occupying the subcarrier with the highest frequency.

The control information may further include a sounding reference signal (SRS), and the SRS is mapped onto the last OFDM symbol along the time domain direction in the physical resource block. It should be noted that, whether the sounding reference signal SRS is mapped into the physical resource block is determined by practical application demand.

The data information is mapped onto a blank RE in the physical resource block excluding an RE occupied by the control information.

According to the method for D2D communication provided by the embodiment of the present invention, an uplink physical channel of D2D communication is designed with reference to a structure of an uplink physical channel of LTE-A, which can improve spectral efficiency and data transmission rate.

Preferably, the physical resource block is expressed by a two-dimensional plane composed of time and frequency. The physical resource block includes 14 orthogonal frequency division multiplexing (OFDM) symbols in the time domain and includes 12 subcarriers in the frequency domain; or the physical resource block includes 12 orthogonal frequency division multiplexing (OFDM) symbols in the time domain and includes 12 subcarriers in the frequency domain.

A method for designing a D2D uplink physical channel will be illustrated below in detail in combination with FIG. 5 to FIG. 6.

Figure 5:
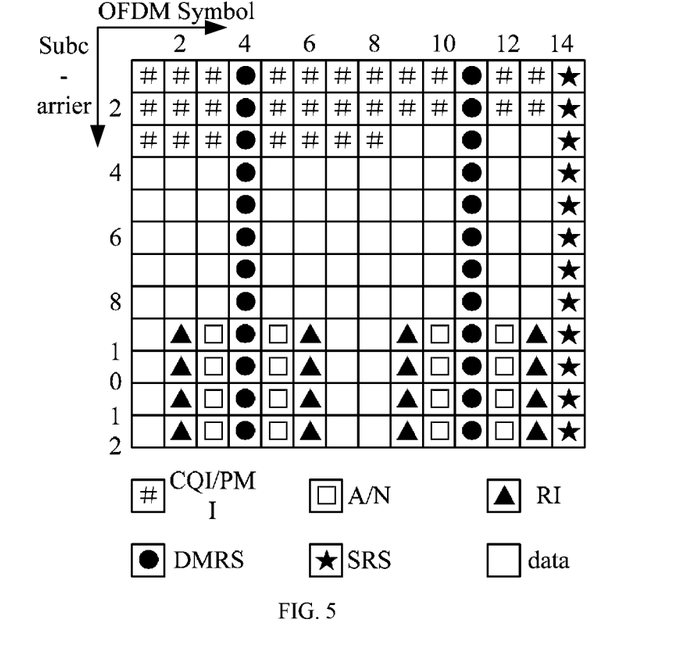
FIG. 5 is a schematic diagram of an uplink physical channel of a fifth embodiment of a method for D2D communication provided by the present invention.

Referring to FIG. 5, an uplink physical channel of a fifth embodiment of the method for D2D communication provided by the present invention is schematically depicted.

In the fifth embodiment, a physical resource block includes 14 orthogonal frequency division multiplexing (OFDM) symbols in the time domain, which are the first OFDM symbol to the $14^{th}$ OFDM symbol in sequence along a time domain direction. The physical resource block includes 12 subcarriers in the frequency domain, which are the first subcarrier to the $12^{th}$ subcarrier in sequence along a direction from high frequency to low frequency.

The control information includes a channel quality indicator (CQI), a pre-coding matrix indicator (PMI), a demodulation reference signal (DMRS), a sounding reference signal (SRS), an acknowledgement/negative acknowledgement (A/N) and a rank indicator (RI).

The control information and the data information are carried in a physical resource block by means of the following manner.

The DMRS is mapped onto the $4^{th}$ and the $11^{th}$ OFDM symbols in the physical resource block.

The A/N is mapped onto the $3^{rd}$, the $5^{th}$, the $10^{th}$ and the $12^{th}$ OFDM symbols in the physical resource block and is distributed from low frequency to high frequency. The OFDM symbols occupied by the A/N are adjacent to the OFDM symbols occupied by the DMRS.

The RI is mapped onto the $2^{nd}$, the $6^{th}$, the $9^{th}$ and the $13^{th}$ OFDM symbols in the physical resource block and is distributed from low frequency to high frequency. One OFDM symbol is present between the OFDM symbols occupied by the RI and the OFDM symbols occupied by the DMRS.

The SRS is mapped onto the last OFDM symbol in the physical resource block along the time domain direction, namely, the SRS is mapped onto the $14^{th}$ OFDM symbol in the physical resource block.

The CQI and the PMI are mapped onto a blank RE in high frequency part of the physical resource block, The CQI and the PMI are mapped from the first subcarrier with the highest frequency, distributed along the time domain direction and extended onto a next adjacent subcarrier after the first subcarrier is fully occupied. Specifically, as shown in FIG. 5, the CQI and the PMI are mapped onto the blank RE of the high frequency part in the physical resource block, and starting from the first subcarrier along the time domain direction, the CQI and the PMI are transversely distributed from left to right. The CQI and the PMI are moved onto the second subcarrier after the first subcarrier is fully occupied and are transversely distributed from left to right likewise, and so on, until configuration of the CQI and the PMI are completed.

The data information is mapped onto a blank RE in the physical resource block excluding the RE onto which the control information is mapped.

Figure 6:
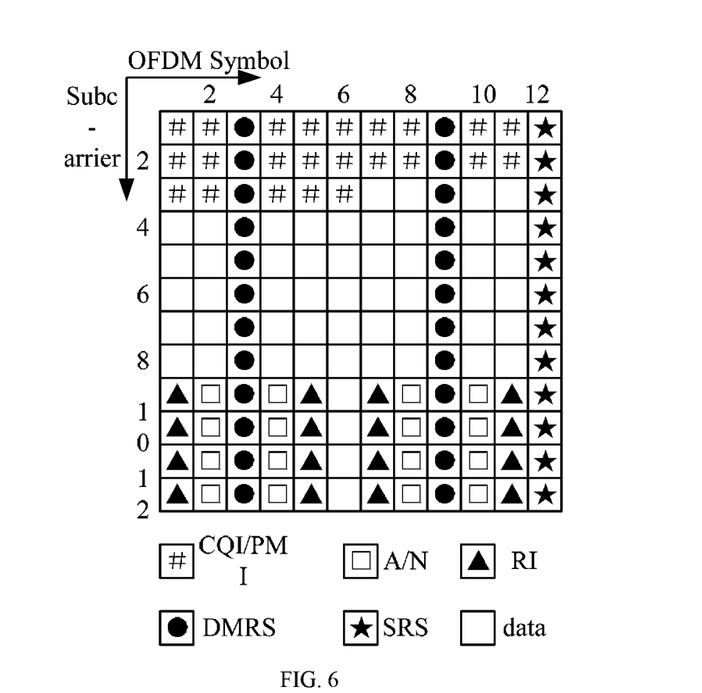
FIG. 6 is a schematic diagram of an uplink physical channel of a sixth embodiment of a method for D2D communication provided by the present invention.

Referring to FIG. 6, an uplink physical channel of a sixth embodiment of the method for D2D communication provided by the present invention is schematically depicted.

In the sixth embodiment, a physical resource block includes 12 orthogonal frequency division multiplexing (OFDM) symbols in the time domain, which are the first OFDM symbol to the 12$^{th}$ OFDM symbol in sequence along a time domain direction. The physical resource block includes 12 subcarriers in the frequency domain, which are the first subcarrier to the 12$^{th}$ subcarrier in sequence along a direction from high frequency to low frequency.

The control information includes a channel quality indicator (CQI), a pre-coding matrix indicator (PMI), a demodulation reference signal (DMRS), a sounding reference signal (SRS), an acknowledgement/negative acknowledgement (A/N) and a rank indicator (RI).

The control information and the data information are carried in a physical resource block by means of the following manner.

The DMRS is mapped onto the 3$^{rd}$ and the 9$^{th}$ OFDM symbols in the physical resource block.

The A/N is mapped onto the 2$^{nd}$, the 4$^{th}$, the 8$^{th}$ and the 10$^{th}$ OFDM symbols in the physical resource block and is distributed from low frequency to high frequency. The OFDM symbols occupied by the A/N are adjacent to the OFDM symbols occupied by the DMRS.

The RI is mapped onto the 1$^{st}$, the 5$^{th}$, the 7$^{th}$ and the 11$^{th}$ OFDM symbols in the physical resource block and is distributed from low frequency to high frequency. One OFDM symbol is present between the OFDM symbols occupied by the RI and the OFDM symbols occupied by the DMRS.

The SRS is mapped onto the last OFDM symbol along the time domain direction in the physical resource block, namely, the SRS is mapped onto the 12$^{th}$ OFDM symbol in the physical resource block.

The CQI and the PMI are mapped onto a blank RE in high frequency part of the physical resource block. The CQI and the PMI are mapped from the first subcarrier with the highest frequency, distributed along the time domain direction and extended onto a next adjacent subcarrier after the first subcarrier is fully occupied. Specifically, as shown in FIG. 6, the CQI and the PMI are mapped onto the blank REs in the high frequency part of the physical resource block, and starting from the first subcarrier along the time domain direction, the CQI and the PMI are transversely distributed from left to right from. The CQI and the PMI are moved onto the second subcarrier after the first subcarrier is fully occupied and are transversely distributed from left to right likewise, and so on, until configuration of the CQI and the PMI are completed.

The data information is mapped onto a blank RE in the physical resource block excluding the RE onto which the control information is mapped.

During specific implementation, an executive body of the method for D2D communication provided by the above-mentioned fifth embodiment and sixth embodiment may be a device for D2D communication, or a device provided with D2D communication functionality. Two devices for D2D communication have equivalent uplink and downlink channels, and thus use a same physical channel design.

When device 1 for D2D communication communicates with device 2 for D2D communication, design of the physical channel in the above-mentioned embodiment is simultaneously applied to a link from the device 1 for D2D communication to the device 2 for D2D communication and a link from the device 2 for D2D communication to the device 1 for D2D communication. The device 1 for D2D communication carries the control information and the data information, which are needed to be sent, in a physical resource block, and sends the physical resource block to the device 2 for D2D communication through a D2D uplink communication link. The device 2 for D2D communication determines a modulation and coding scheme (MCS) (e.g., adopting QPSK, 16QAM or 64QAM) used by downlink according to the control information in the physical resource block, and determines which code rate to be adopted, so as to achieve adaptive modulation and coding (AMC, Adaptive Modulation and Coding, i.e., dynamically selecting a proper modulation and coding manner according to change of channel condition).

An embodiment of the present invention further provides a device for D2D communication, which may achieve a flow of the method for D2D communication in the above-mentioned embodiment.

Figure 7:
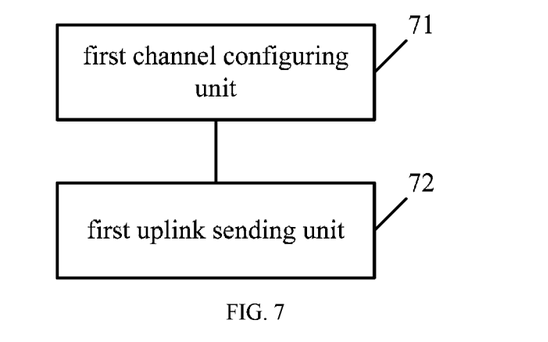
FIG. 7 is a schematic diagram of a structure of a device for D2D communication provided by an embodiment of the present invention.

Referring to FIG. 7, a structure of a device for D2D communication in an embodiment provided the present invention is schematically depicted.

The device for D2D communication provided by the embodiment of the present invention includes a first channel configuring unit 71 and a first uplink sending unit 72.

The first channel configuring unit 71 is configured to carry control information and data information, to be sent, in a physical resource block, wherein the physical resource block includes M orthogonal frequency division multiplexing (OFDM) symbols in time domain and includes N subcarriers in frequency domain, wherein time frequency resource defined by one OFDM symbol and one subcarrier is a resource element (RE), and M and N are integers. The control information includes at least one of a modulation and coding scheme (MCS), a redundancy version (RV) and a new data indicator (NDI), wherein at least one of the MCS, the RV and the NDI is mapped onto an RE in high frequency part of the physical resource block, and the data information is mapped onto a blank RE in the physical resource block excluding the RE onto which the control information is mapped.

The uplink sending unit 72 is configured to send the physical resource block to a target user equipment on a device to device (D2D) communication link.

A manner for configuring the physical resource block may be the above-mentioned first embodiment, second embodiment, third embodiment and fourth embodiment.

Figure 8:
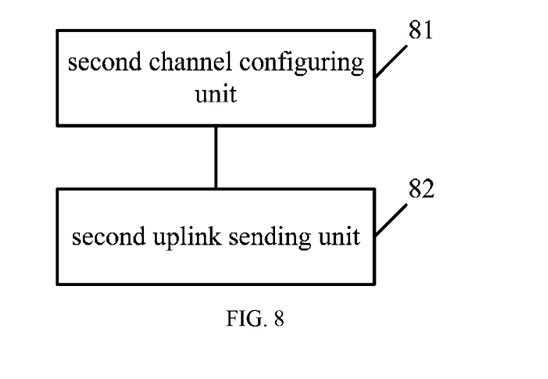
FIG. 8 is a schematic diagram of a structure of a device for D2D communication provided by an embodiment of the present invention.

Referring to FIG. 8, a structure of a device for D2D communication in another embodiment provided the present invention is schematically depicted.

The device for D2D communication provided by the embodiment of the present invention includes a second channel configuring unit 81 and a second uplink sending unit 82.

The second channel configuring unit 81 is configured to carry control information and data information, to be sent, in a physical resource block, wherein the physical resource block includes M orthogonal frequency division multiplexing (OFDM) symbols in time domain and includes N subcarriers in frequency domain, wherein time frequency resource defined by one OFDM symbol and one subcarrier is a resource element (RE), and M and N are integers. The control information includes at least one of a channel quality indicator (CQI) and a pre-coding matrix indicator (PMI), wherein at least one of the CQI and the PMI is mapped onto an RE in high frequency part of the physical resource block, and the data information is mapped onto a blank RE in the physical resource block excluding the RE onto which the control information is mapped.

The second uplink sending unit 82 is configured to send the physical resource block to a target user equipment on a device to device (D2D) communication link.

A manner for configuring the physical resource block may be the above-mentioned fifth embodiment and sixth embodiment.

It should be noted that, the method and device for D2D communication provided by the embodiments of the present invention are used for describing a design scheme of a D2D uplink physical channel by taking a physical resource block of 14 OFDM symbols×12 subcarriers and a physical resource block of 12 OFDM symbols×12 subcarriers as examples, and the design scheme of the physical channel may also be applied to other physical resource block of M OFDM symbols×N subcarriers.

According to the method and device for D2D communication provided by the embodiments of the present invention, the uplink physical channel of D2D communication is designed with reference to the structure of the uplink physical channel of LTE-A. Signals such as MCS, RV, NDI, CQI, PMI and the like are mapped onto an RE in high frequency part of the physical resource block, and are distributed separately from signals such as A/N, RI and the like, which are mapped onto an RE in low frequency part, such that each kind of signal on the physical resource block may be distributed relatively intensively and continuously. In the embodiments of the present invention, the uplink physical channel of D2D communication is reasonably configured so as to achieve communication between D2D devices, thereby improving spectral efficiency and data transmission rate.

Those of ordinary skill in the art may understand that all or a part of the flows in the methods in the above-mentioned embodiments may be implemented with a computer program instructing related hardware, e.g. a processor. The foregoing program may be stored in a computer readable storage medium, and when the program is executed, the program may include the flows of the methods in the above-mentioned embodiments. The storage medium may be a magnetic disk, an optical disk, a read-only memory (Read-Only Memory, ROM), a random access memory (Random Access Memory, RAM) or the like.

The foregoing descriptions are preferred implementations of the present invention. It should be noted that, those of ordinary skill in the art may make various improvements and modifications without departing from the principle of the present invention, and these improvements and modifications shall be encompassed in the protection scope of the present invention.

What is claimed is:

1. A method for device-to-device (D2D) communication, comprising:
   carrying control information and data information, to be sent, in a physical resource block; and
   sending the physical resource block to a target user equipment (UE) on a D2D communication link,
   wherein the physical resource block comprises M orthogonal frequency division multiplexing (OFDM) symbols in a time domain and N subcarriers in a frequency domain,
   wherein a time frequency resource defined by one OFDM symbol and one subcarrier is a resource element (RE),
   wherein M and N are integers,
   wherein the control information comprises at least one of a modulation and coding scheme (MCS), a redundancy version (RV), and a new data indicator (NDI),
   wherein at least one of the MCS, the RV, and the NDI is mapped onto an RE in a high frequency part of the physical resource block, and
   wherein the data information is mapped onto a blank RE in the physical resource block excluding the RE onto which the control information is mapped;
   wherein the control information further comprises a demodulation reference signal (DMRS), an acknowledgement/negative acknowledgement (A/N), and a rank indicator (RI);
   wherein the DMRS is mapped onto a first OFDM symbol in the physical resource block,
   wherein the A/N is mapped onto a second OFDM symbol in the physical resource block and distributed on the second OFDM symbol from low frequency to high frequency,
   wherein the second OFDM symbol is adjacent to the first OFDM symbol,
   wherein the RI is mapped onto a third OFDM symbol in the physical resource block and distributed on the third OFDM symbol from low frequency to high frequency, and
   wherein one OFDM symbol is present between the third OFDM symbol and the first OFDM symbol.

2. The method of claim 1, wherein at least one of the MCS, the RV, and the NDI, which is mapped onto a blank RE in the high frequency part of the physical resource block, is mapped from a subcarrier with a highest frequency, distributed along a time domain direction, and extended onto a next adjacent subcarrier after fully occupying the subcarrier with the highest frequency.

3. The method of claim 1, wherein at least one of the MCS, the RV, and the NDI is mapped onto a fourth OFDM symbol in the physical resource block and distributed on the fourth OFDM symbol from high frequency to low frequency, wherein the fourth OFDM symbol is adjacent to the first OFDM symbol.

4. The method of claim 1, wherein the control information further comprises a sounding reference signal (SRS), the SRS being mapped onto a last OFDM symbol along the time domain direction in the physical resource block.

5. The method of claim 4, wherein one of following is satisfied:
   the physical resource block comprises 14 OFDM symbols in the time domain and 12 subcarriers in the frequency domain; and
   the physical resource block comprises 12 OFDM symbols in the time domain and 12 subcarriers in the frequency domain.

6. A method for device-to-device (D2D) communication, comprising:
   carrying control information and data information, to be sent, in a physical resource block; and
   sending the physical resource block to a target user equipment on a D2D communication link,
   wherein the physical resource block comprises M orthogonal frequency division multiplexing (OFDM) symbols in a time domain and N subcarriers in a frequency domain,
   wherein a time frequency resource defined by one OFDM symbol and one subcarrier is a resource element (RE),
   wherein M and N are integers
   wherein the control information comprises at least one of a channel quality indicator (CQI) and a pre-coding matrix indicator (PMI),
   wherein at least one of the CQI and the PMI is mapped onto an RE in a high frequency part of the physical resource block, and wherein the data information is mapped onto a blank RE in the physical resource block excluding the RE onto which the control information is mapped;

wherein the control information further comprises a demodulation reference signal (DMRS), an acknowledgement/negative acknowledgement (A/N), and a rank indicator (RI);

wherein the DMRS is mapped onto a first OFDM symbol in the physical resource block;

wherein the A/N is mapped onto a second OFDM symbol in the physical resource block and distributed on the second OFDM symbol from low frequency to high frequency, and wherein the second OFDM symbol is adjacent to the first OFDM symbol, wherein the RI is mapped onto a third OFDM symbol in the physical resource block and distributed on the third OFDM symbol from low frequency to high frequency, wherein one OFDM symbol is present between the third OFDM symbol and the first OFDM symbol; and wherein at least one of the CQI and the PMI, which is mapped onto the RE in the high frequency part of the physical resource block, is mapped from a subcarrier with a highest frequency, distributed along a time domain direction, and extended onto a next adjacent subcarrier after fully occupying the subcarrier with the highest frequency.

7. The method of claim 6, wherein the control information further comprises a sounding reference signal (SRS), the SRS being mapped onto a last OFDM symbol along the time domain direction in the physical resource block.

8. The method of claim 6, wherein one of following is satisfied:
the physical resource block comprises 14 OFDM symbols in the time domain and 12 subcarriers in the frequency domain; and
the physical resource block comprises 12 OFDM symbols in the time domain and 12 subcarriers in the frequency domain.

9. A device for performing device-to-device (D2D) communication, comprising: a processor and a non-transitory computer-readable medium including computer-executable instructions executed by the processor to perform operations comprising:
carrying control information and data information in a physical resource block, wherein the physical resource block comprises M orthogonal frequency division multiplexing (OFDM) symbols in a time domain and N subcarriers in frequency domain, a time frequency resource defined by one OFDM symbol and one subcarrier is a resource element (RE), M and N are integers, the control information comprises at least one of a modulation and coding scheme (MCS), a redundancy version (RV) and a new data indicator (NDI), at least one of the MCS, the RV, and the NDI being mapped onto an RE in a high frequency part of the physical resource block, and the data information being mapped onto a blank RE in the physical resource block excluding the RE onto which the control information is mapped; and
sending the physical resource block to a target user equipment on a D2D communication link;
wherein the control information further comprises a demodulation reference signal (DMRS), an acknowledgement/negative acknowledgement (A/N), and a rank indicator (RI), wherein the DMRS is mapped onto a first OFDM symbol in the physical resource block, wherein the A/N is mapped onto a second OFDM symbol in the physical resource block and distributed on the second OFDM symbol from low frequency to high frequency, wherein the second OFDM symbol occupied by the A/N is adjacent to the first OFDM symbol occupied by the DMRS, wherein the RI is mapped onto a third OFDM symbol in the physical resource block and distributed on the third OFDM symbol from low frequency to high frequency, and wherein one OFDM symbol is present between the third OFDM symbol and the first OFDM symbol.

10. The device of claim 9, wherein at least one of the MCS, the RV, and the NDI, which is mapped onto the RE in the high frequency part of the physical resource block, is mapped from a subcarrier with a highest frequency, distributed along a time domain direction, and extended onto a next adjacent subcarrier after fully occupying the subcarrier with the highest frequency.

11. The device of claim 9, wherein at least one of the MCS, the RV, and the NDI is mapped onto a fourth OFDM symbol in the physical resource block, and is distributed on the fourth OFDM symbol from high frequency to low frequency,
wherein the fourth OFDM symbol is adjacent to the first OFDM symbol.

12. The device of claim 9, wherein the control information further comprises a sounding reference signal (SRS), the SRS being mapped onto a last OFDM symbol along a time domain direction in the physical resource block.

13. The device of claim 12, wherein one of following is satisfied:
the physical resource block comprises 14 OFDM symbols in the time domain and 12 subcarriers in the frequency domain; and
the physical resource block comprises 12 OFDM symbols in the time domain and 12 subcarriers in the frequency domain.

14. A device for performing device-to-device (D2D) communication, comprising: a processor and a non-transitory computer-readable medium including computer-executable instructions executed by the processor to perform operations comprising:
carrying control information and data information in a physical resource block, wherein the physical resource block comprises M orthogonal frequency division multiplexing (OFDM) symbols in time domain and N subcarriers in frequency domain, a time frequency resource defined by one OFDM symbol and one subcarrier is a resource element (RE), M and N are integers, the control information comprises at least one of a channel quality indicator (CQI) and a pre-coding matrix indicator (PMI), at least one of the CQI and the PMI being mapped onto an RE in a high frequency part of the physical resource block, and the data information being mapped onto a blank RE in the physical resource block excluding the RE onto which the control information is mapped; and
sending the physical resource block to a target user equipment on a D2D communication link;
wherein the control information further comprises a demodulation reference signal (DMRS), an acknowledgement/negative acknowledgement (A/N), and a rank indicator (RI);

wherein the DMRS is mapped onto a first OFDM symbol in the physical resource block, wherein the A/N is mapped onto a second OFDM symbol in the physical resource block and distributed on the second OFDM symbol from low frequency to high frequency, wherein the second OFDM symbol is adjacent to the first OFDM symbol, wherein the RI is mapped onto a third OFDM symbol in the physical resource block and distributed on the third OFDM symbol from low frequency to high frequency, and wherein one OFDM symbol is present between the third OFDM symbol and the first OFDM symbol, and wherein at least one of the CQI and the PMI, which is mapped onto a blank RE in the high frequency part of the physical resource block, is mapped from a subcarrier with a highest frequency, distributed along a time domain direction, and extended onto a next adjacent subcarrier after fully occupying the subcarrier with the highest frequency.

15. The device of claim 14, wherein the control information further comprises a sounding reference signal (SRS), the SRS being mapped onto a last OFDM symbol along the time domain direction in the physical resource block.

16. The device of claim 14, wherein one of following is satisfied:

the physical resource block comprises 14 OFDM symbols in the time domain and 12 subcarriers in the frequency domain; and the physical resource block comprises 12 OFDM symbols in the time domain and 12 subcarriers in the frequency domain.

\* \* \* \* \*